(12) United States Patent
Dwyer

(10) Patent No.: US 6,697,971 B1
(45) Date of Patent: Feb. 24, 2004

(54) SYSTEM AND METHOD FOR DETECTING ATTEMPTS TO ACCESS DATA RESIDING OUTSIDE OF ALLOCATED MEMORY

(75) Inventor: Lawrence D. K. B. Dwyer, South San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 09/695,363

(22) Filed: Oct. 24, 2000

(51) Int. Cl.[7] .................................................. H02H 3/05
(52) U.S. Cl. ......................................... 714/54; 714/763
(58) Field of Search .............................. 714/25, 29, 42, 714/47, 54, 38, 718, 763, 765, 766; 711/100, 111, 112, 152, 154, 163

(56) References Cited

U.S. PATENT DOCUMENTS

| | | | |
|---|---|---|---|
| 5,325,499 A | 6/1994 | Kummer et al. | 395/425 |
| 5,548,746 A | 8/1996 | Carpenter et al. | 395/500 |
| 5,561,786 A * | 10/1996 | Morse | 711/170 |
| 5,627,987 A | 5/1997 | Nozue et al. | 395/410 |
| 5,784,699 A | 7/1998 | McMahon et al. | 711/171 |
| 5,802,397 A | 9/1998 | Greenstein et al. | 395/856 |
| 5,915,265 A | 6/1999 | Crocker et al. | 711/170 |
| 6,363,467 B1 * | 3/2002 | Weeks | 711/170 |
| 6,427,143 B1 * | 7/2002 | Isip et al. | 707/1 |
| 6,470,430 B1 * | 10/2002 | Fischer et al. | 711/153 |

* cited by examiner

Primary Examiner—Dieu-Minh Le

(57) ABSTRACT

A function of a computer program is executed by a computer system capable of detecting whether an instruction of the function, if executed, will access memory that has not been allocated to the function. More specifically, a memory device is loaded with data indicative of which locations of memory are allocated to a computer program function. Processing circuitry that is processing an instruction of the function for execution is configured to detect, based on the foregoing data, whether a memory location to be accessed via execution of the instruction is one of the memory locations allocated to the function. If the memory location is outside of the memory allocated to the function, the circuitry may prevent execution of the instruction and/or may transmit an error signal. Thus, data errors caused by accessing memory that has not been allocated to the function can be prevented.

35 Claims, 3 Drawing Sheets

SYSTEM AND METHOD FOR DETECTING ATTEMPTS TO ACCESS DATA RESIDING OUTSIDE OF ALLOCATED MEMORY

BACKGROUND OF THE INVENTION

1. Field of the Invention

The present invention generally relates to data processing techniques and, in particular, to a system and method for detecting whether an instruction of a computer program function, if executed, will access a memory location that has not been allocated to the computer program function.

2. Related Art

In executing instructions of computer programs, a conventional computer system typically divides the memory resources of the computer system among the various functions of the computer programs. For example, a computer system that is used to execute a first function and a second function of a computer program typically allocates a first portion of its memory to the first function and a second portion of its memory to the second function. During operation, the first function may store to and/or retrieve data from the first portion of memory that is allocated to the first function, and the second function may store to and/or retrieve data from the second portion of memory that is allocated to the second function.

A data error may occur if a function attempts to access a memory location outside of the memory allocated to the function. For example, the aforementioned first function may temporarily store a data value in the memory that is allocated to the first portion. At a later time, the first function may retrieve this data value and utilize this data value to perform an operation. However, between the times that the data value is stored and retrieved by the first function, the aforementioned second function may erroneously overwrite the foregoing data value with another data value, even though the second function should only store data to the memory that is allocated to the second function. As a result of the second function improperly overwriting the data value stored by the first function, the first function retrieves the data value stored by the second function instead of the data value previously stored by the first function. In other words, the first function retrieves the wrong data value. The retrieval of the wrong data value may result in a data error that causes the first function to operate incorrectly.

The cause of this data error is very difficult to detect because the error occurs in the first function, which does not include the bug that caused the error. In this regard, the bug probably exists in the second function, even though the error occurs in the first function. Thus, a programmer may attempt to debug the first function when the programmer should really be focusing on the second function.

In another example, the second function may erroneously read a value from a location within the memory allocated to the first function. Therefore, the second function may read an incorrect data value, which may cause a data error in the second function. This type of bug is a little easier to detect since the function that experiences the data error is the same function that caused the data error. Nevertheless, it is desirable to detect and prevent such data errors, when possible.

Thus, a heretofore unaddressed need exists in the industry for providing a system and method for detecting and/or preventing data errors caused by a function attempting to access a memory location outside of the memory allocated to the function.

SUMMARY OF THE INVENTION

The present invention overcomes the inadequacies and deficiencies of the prior art as discussed hereinbefore. Generally, the present invention provides a system and method for detecting whether an instruction of a function, if executed, will access a memory location that has not been allocated to the function.

In architecture, the system of the present invention utilizes memory, a memory device, and circuitry that is configured to process and execute instructions of computer programs. The memory device is loaded with data indicative of which locations of the memory are allocated to a computer program function. The circuitry is configured to detect, based on the data, whether a memory location to be accessed via execution of an instruction of the function is one of the memory locations allocated to the function.

In accordance with a feature of the present invention, the circuitry prevents execution of the instruction when the circuitry detects that a memory location to be accessed via execution of the instruction is not one of the memory locations allocated to the function. Preventing execution of such instructions may be selective based on a run time input.

In accordance with another feature of the present invention, an error message is displayed to a user of the system when the circuitry detects that a memory location to be accessed via execution of the instruction is not one of the memory locations allocated to the function.

In accordance with another feature of the present invention, the data indicating which memory locations are allocated to the function is updated when additional memory locations are allocated to the function.

The present invention can also be viewed as providing a method for detecting attempts by a function to access memory that has not been allocated to the function. The method can be broadly conceptualized by the following steps: providing memory and a processor pipeline; allocating memory locations of the memory to a computer program function; storing data indicative of which memory locations of the memory are allocated to the function; detecting, based on the data, whether an instruction of the function, if executed, accesses one of the memory locations allocated to the function; and disabling the pipeline from executing the instruction while the pipeline is processing the instruction and in response to a detection in the detecting step that the instruction, if executed, accesses a memory location that has not been allocated to the function.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

In general, the present invention pertains to a system and method for detecting and preventing data errors caused by attempts to access unauthorized memory locations within a computer system. A computer system 20 in accordance with one embodiment of the present invention is depicted by FIG. 1.

Figure 1:
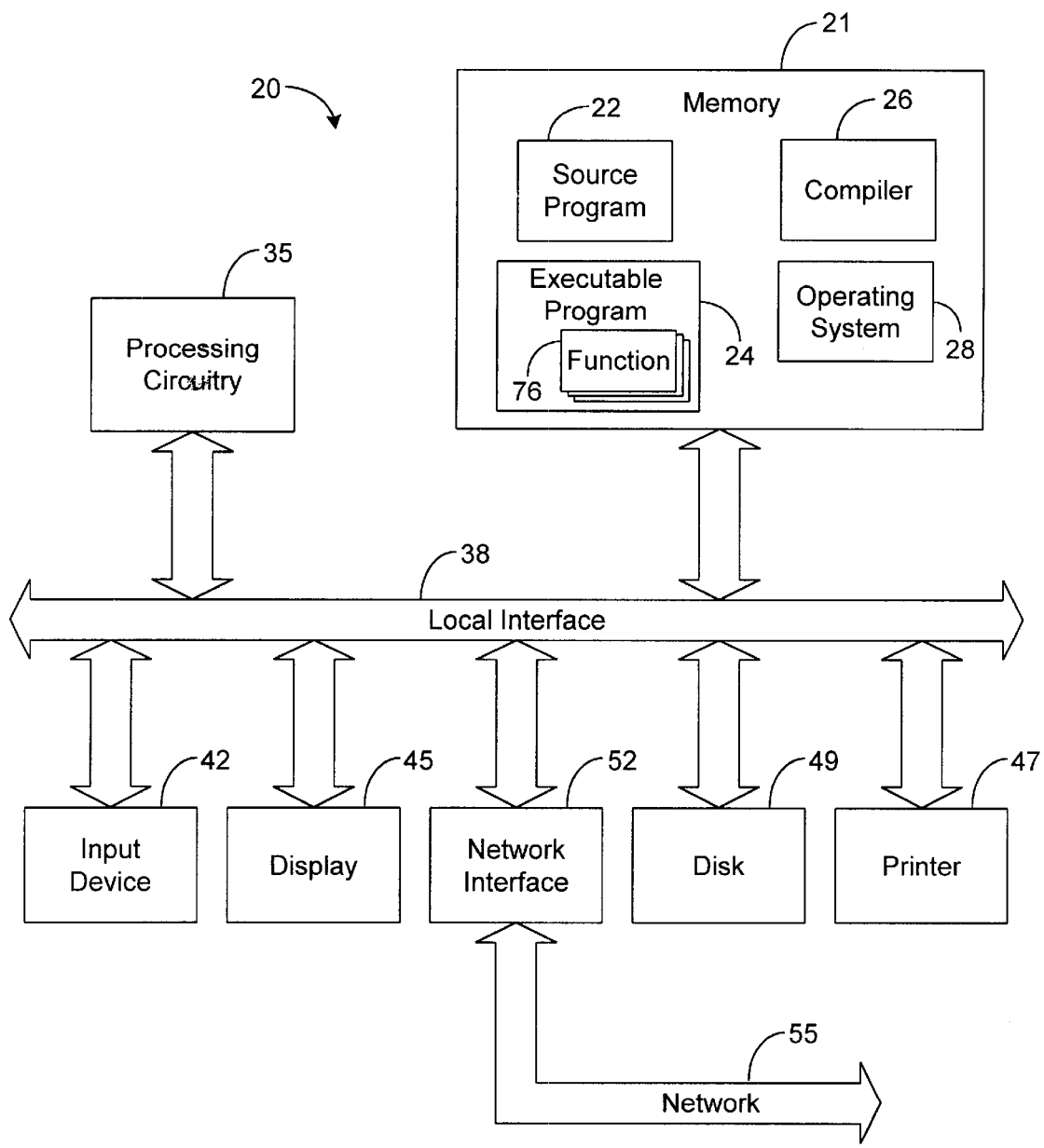
FIG. 1 is a block diagram illustrating a computer system that may be employed to implement the principles of the present invention.

As can be seen by referring to FIG. 1, the system 20 includes memory 21 for storing and retrieving data. Similar to conventional memory systems, the memory 21 depicted by FIG. 1 includes various locations for storing data, and each of these locations is identified by an address.

In the embodiment depicted by FIG. 1, a source program 22, an executable program 24, a compiler 26, and an operating system 28 are stored in the computer memory 21. The computer system 20 of FIG. 1 also includes processing circuitry 35, such as a digital signal processor (DSP), for example, that communicates to and drives the other elements within the system 20 via a local interface 38, which can include one or more buses. Furthermore, an input device 42, for example, a keyboard or a mouse, can be used to input data from a user of the system 20, and a screen display 45 or a printer 47 can be used to output data to the user. A disk storage mechanism 49 can be connected to the local interface 38 to transfer data to and from a nonvolatile disk (e.g, magnetic, optical, etc.). The system 20 can be connected to a network interface 52 that allows the system 20 to exchange data with a network 55.

The source program 22 includes instructions or computer code written by a programmer for performing various functionality. Programmers often choose to write programs, such as the source program 22, in a high level computer language such as C or Fortran, for example. Translation of these high level programs into a lower level machine code is often required before the programs can be executed. Thus, the compiler 26 is configured to translate the source program 22 into executable program 24, which is in a form compatible with processing circuitry 35 and, therefore, can be executed by processing circuitry 35.

The operating system 28, similar to conventional operating systems, is designed to control the operation of the computer system 20. An important service performed by the operating system 28 is the interfacing of executable instructions with the processing circuitry 35. In this regard, the operating system 28 controls which instructions stored in memory 21 are transmitted to the processing circuitry 35 for execution and controls when these instructions are transmitted to the processing circuitry 35.

The compiler 26 and the operating system 28 can be implemented in software, hardware, or a combination thereof. In the preferred embodiment, as illustrated by way of example in FIG. 1, the compiler 26 and the operating system 28 along with their associated methodology are implemented in software and stored in memory 21.

Note that the compiler 26 and the operating system 28, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Note that is it not necessary for the source program 22 and/or the compiler 26 to be stored in the same computer system 20 as the executable program 24 and the operating system 28. In this regard, the source program 22 may be translated into executable program 24 by a compiler 26 on another computer system (not shown), and the executable program 24 may then be downloaded into the computer system 20 shown by FIG. 1. Furthermore, it is possible for a programmer to write the executable program 24 directly, thereby eliminating the need of a compiler 26.

Figure 2:
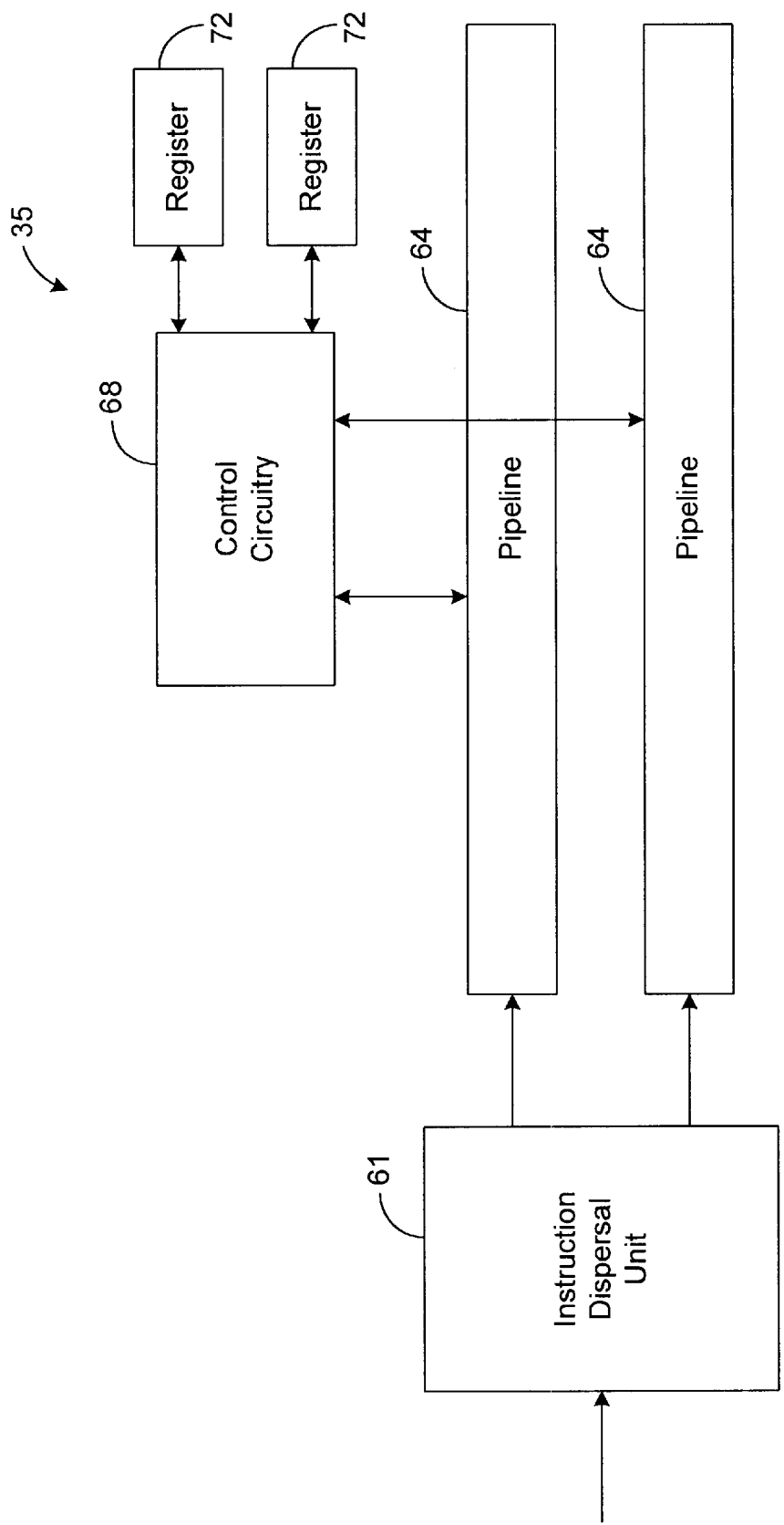
FIG. 2 is a block diagram illustrating a more detailed view of an exemplary embodiment of processing circuitry depicted in FIG. 1.

FIG. 2 depicts a more detailed view of a preferred embodiment of the processing circuitry 35. As can be seen by referring to FIG. 2, the processing circuitry 35 preferably includes an instruction dispersal unit (IDU) 61 that is designed to receive the instructions transmitted to the processing circuitry 35 by the operating system 28. Through conventional techniques, the instruction dispersal unit 61 is designed to interface the received instructions with one or more pipelines 64 that are configured to process and execute the instructions via conventional techniques.

The processing circuitry 35 also includes control circuitry 68 that is designed to control the processing and execution of instructions by the pipelines 64. For example, the control circuitry 68 may analyze the instructions being processed by the pipelines 64 and may stall instructions to prevent data errors. The control circuitry 68 may also prevent the execution of an instruction being processed by one of the pipelines 64 when the control circuitry 68 determines that the instruction, should not be executed. In this regard, the control circuitry 68 may transmit to the pipeline 64 processing the instruction an enable signal that either enables or disables execution of the instruction by the pipeline 64. For example, when the enable signal is asserted, the foregoing pipeline 64 may be configured to allow the instruction to pass through the pipeline 64 without executing, and when the enable signal is deasserted, the foregoing pipeline 64 may be configured to execute the instruction. The techniques for utilizing an enable signal to control whether or not an instruction within a pipeline 64 is executed is generally well known in the art.

In the preferred embodiment, the processing circuitry 35 also includes one or more registers 72 that may be used by the control circuitry 68 for storing data. The utilization of these registers 72 will be described in further detail hereinafter. It should be emphasized that the embodiment shown by FIG. 2 is exemplary and that various other configurations of the processing circuitry 35 may be employed without departing from the principles of the present invention.

As shown by FIG. 1, the executable program 24 may include one or more functions 76. As known in the art, a "function" is a portion of a program for performing certain functionality. Each function 76 is usually characterized by a beginning statement that indicates the beginning of the function 76 and an ending statement that indicates the ending of the function 76. All of the data included between the beginning statement and the ending statement is usually associated with and defines the functionality of the function 76.

In compiling source program 22 into executable program 24, the compiler 26 is configured to allocate, respectively, certain locations within memory 21 to each function 76 for storing data. Furthermore, the source program 22 is translated by the compiler 26 such that each read or write instruction included in a particular function 76 should only attempt to read from or write to an address that has been allocated to the particular function. However, errors can occur either at compile time or at run time that may cause an instruction included in a function 76 to access (i.e., read from or write to) a memory location outside of the function's allocated memory 21.

To detect and/or prevent such errors, the compiler 26 is preferably designed to define for each function 76 data, hereafter referred to as "range data," that indicates which memory locations have been allocated to the function 76. The compiler 26 is also preferably designed to include instructions in the program 24 to cause this range data to be stored in the registers 72 (FIG. 2) when the function 76 is being executed by processing circuitry 35. As an example, assume that the compiler 26 allocates a contiguous block of memory 21 to a particular function 76. The range data in this example may include the two memory addresses that define the boundaries of the contiguous block of memory 21 (i.e., the address of the first memory location in the contiguous block of memory 21 and the address of the last memory location in the contiguous block of memory 21). At the beginning of the function 76 (e.g., after the beginning statement of the function 76), the compiler 26 preferably inserts instructions for storing the two memory addresses in one or more of the registers 72 such that the two instructions are stored in the registers 72 in response to invocation of the function 76. Therefore, the two aforementioned memory addresses should be stored in one or more of the registers 72 while the remainder of the instructions defining the function 76 are executed by the processing circuitry 35.

The processing circuitry 35 is preferably configured to execute a read or write instruction from the function 76 only if the read or write instruction is attempting to access a memory location within the range defined by the range data associated with the function 76. In this regard, the control circuitry 68 is preferably configured to analyze each instruction of the function 76 being processed by the pipelines 64. Before an instruction from the function 76 is executed, the control circuitry 68 is designed to compare the address of the memory location that will be accessed via execution of the instruction to the range data previously stored in the registers 76. This range data should indicate which memory locations have been allocated to the function 76. If the foregoing address compared to the range data does not identify a memory location allocated to the function 76, then the control circuitry 68 is designed to disable execution of the instruction. Therefore, the instruction should pass through a pipeline 64 without executing, thereby preventing a potential data error from occurring.

However, if the foregoing address compared to the range data does identify a memory location allocated to the function 76, then the control circuitry 68 is designed to enable execution of the instruction, unless there is some other independent reason for preventing execution of the instruction. Thus, when an instruction attempts to access a memory location within the memory 21 allocated to the function 76, the control circuitry 68 should allow the instruction to execute, provided there is no other reason independent of the range data for preventing execution of the instruction.

As an example, assume that the range data associated with a function 76 includes two addresses that identify the boundary locations of a contiguous block of memory 21 allocated to the function 76, as described hereinabove. Further, assume that one of the instructions of the function 76 being processed by the one of the pipelines 64 includes an address that identifies a memory location to be accessed via execution of the instruction. During processing of the instruction by the pipeline 64, the control circuitry 68 should compare the instruction address to the two addresses defining the range data. If the instruction address is between the two addresses of the range data, then the instruction address identifies a memory location that has been allocated to the function 76. Therefore, the control circuitry 68 should enable execution of the instruction, unless there is some other independent reason for preventing execution of the instruction. If the instruction address is not between the two addresses of the range data, then the instruction address identifies a memory location that has not been allocated to the function 76. Therefore, a data error could occur if the instruction is executed, and the control circuitry 68 is designed to disable execution of the instruction to prevent the data error.

When the control circuitry 68 detects that an instruction of a function 76 is attempting to access a memory location outside of the memory 21 allocated to the function 76, the control circuitry 68 is preferably designed to transmit a notification signal to the operating system 28. The notification signal preferably indicates which instruction is improperly attempting to access a memory location outside of allocated memory 21, and in response, the operating system 28 may terminate execution of the function 76 that included the foregoing instruction. This may be accomplished by refraining from transmitting any of the instructions of the function 76 to the processing circuitry 35. The operating system 28 preferably displays a message via display 45 and/or printer 47 to inform a user of the system 20 about the improper attempt to access memory 21. The user may utilize the message in debugging the executable program 24.

It should be noted that mechanisms other than the compiler 26 may allocate memory 21 to different functions 76. For example, the operating system 28 may allocate memory to a particular function 76 at run time. When this occurs, the operating system 28 is preferably designed to update the range data associated with the function 76 such that the control circuitry 68 can properly monitor the instructions of the function 76. For example, the operating system 28 may allocate memory 21 to a function 76 being executed by the processing circuitry 35. When this occurs, the operating system 28 may transmit a command to the control circuitry 68 instructing the control circuitry 68 to update the range data of the executing function 76. In response, the control circuitry 68 updates the registers 72 such that the range data of the executing function 76 identifies the newly allocated memory 21 in addition to the memory 21 previously allocated to the function 76. Any mechanism that allocates memory 21 to a function 76 at run time should properly update the range data associated with the function 76 so that the control circuitry 68 can properly monitor the instructions of the function 76.

It should be noted that the operating system 28 may utilize any methodology for updating the registers 72. For example, instead of transmitting a command to control circuitry 68, the operating system 28 may transmit instructions to processing circuitry 35. When executed, these instructions may cause the pipelines 64 to update the registers 72.

Furthermore, it is possible for the range data to be stored in memory 21 outside of the processing circuitry 35 and, therefore, the registers 72 when the function 76 associated with the range data is not running. If additional memory 21 is allocated to the function 76 while the range data is stored in memory 21, then the range data may be updated via reads and/or writes to the memory 21. It should be apparent to one skilled in the art that various techniques and methodologies may be employed to update the range data without departing from the principles of the present invention.

It should be further noted that it is not necessary for the compiler 26 to include instructions in the program 24 for defining and storing range data. In this regard, another mechanism, such as the operating system 28, for example, may be configured to determine which memory 21 is allocated to the functions 76 at run time and define range data for each of the functions 76. Such a mechanism should then transmit a command to the control circuitry 68 or an instruction to the processing circuitry 35 to cause the processing circuitry 35 to store the range data in the registers 72. In another embodiment, the range data may be defined by the compiler 26 or some other mechanism, and the operating system 28 may control when the range data is stored in the registers 72. In this embodiment, the operating system 28 preferably causes the range data of the function 76 to be stored in the registers 72 in response to invocation of the function 76. There are a variety of methodologies that may be employed to define, store, and maintain the range data, as described herein, and it is intended that each of these methodologies be included within the scope of the present invention.

As previously set forth, it is possible for a programmer to write the executable program 24 directly, thereby eliminating the compiling step performed by the compiler 26. In such a case, the programmer may include in the executable program 24 instructions for storing the range data in the registers 72 to enable the control circuitry 68 to properly monitor the instructions of the program 24, as described hereinabove. However, it is not necessary for the programmer to include such instructions in the execution program 24, and any of the aforementioned techniques for storing the range data in the registers 72 may be employed.

The monitoring of the instructions based on the range data to detect data errors according to the principles of the present invention may delay the processing of instructions by the pipelines 64. Thus, to optimize performance, it may be desirable to disable the monitoring of the instructions based on the range data. To achieve this, one or more mode bits, referred to hereafter as a "mode indicator," may be stored and maintained in one of the registers 72 to indicate whether or not the aforementioned monitoring is enabled. This mode indicator is preferably set (e.g., asserted or deasserted) based on a run time input.

For example, the executable program 24 may include instructions that prompt the user for an input indicative of whether or not the user would like the aforementioned monitoring enabled. These instructions would preferably be executed by the processing circuitry 35 in response to invocation of the program 24. Based on the user's input, the mode indicator could be properly set by the operating system 28 and/or the control circuitry 68 to enable or disable the monitoring.

In another example, the operating system 28 may be configured to control the mode indicator. In this regard, the operating system 28 may prompt the user and cause the mode indicator to be set based on a user's input. Alternatively, the operating system 28 may cause the mode bit to be set based on other data available to the operating system 28 at run time. There are a variety of methodologies that may be employed for appropriately setting the mode indicator.

When the mode indicator indicates that the monitoring of the instructions based on the range data is enabled, the control circuitry 68 is configured to analyze the instructions being processed and the range data stored in the registers 72, as described hereinabove. Thus, the control circuitry 68 disables at least some of the instructions based on the range data to prevent data errors. However, when the mode indicator indicates that the monitoring of the instructions based on the range data is disabled, the control circuitry 68 is configured to refrain from analyzing the range data. Instead, the control circuitry 68 enables each instruction, unless there is another reason independent of the range data for preventing execution of the instruction. Thus, the processing of instructions should not be significantly delayed when the monitoring of instructions based on range data is disabled.

OPERATION

Figure 3:
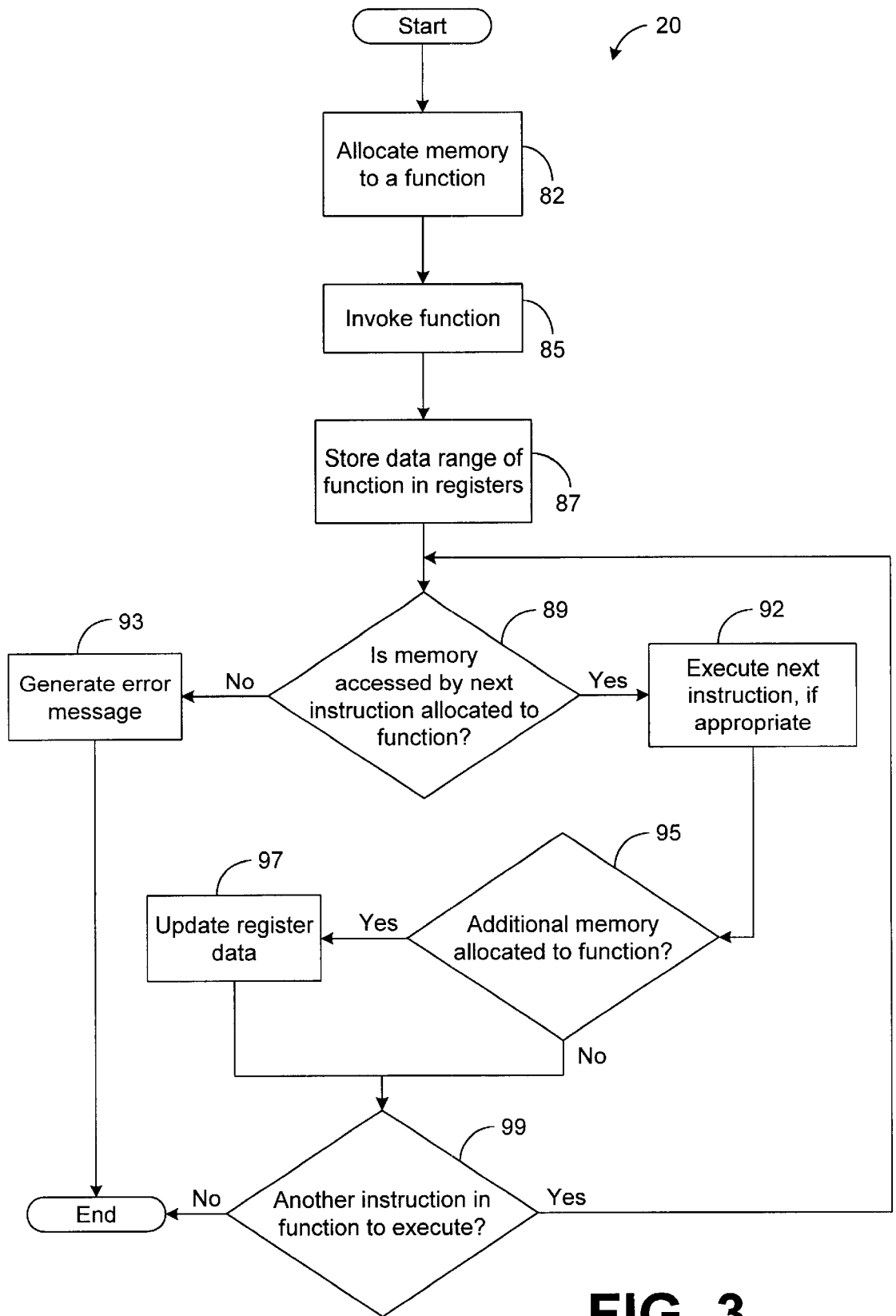
FIG. 3 is a flow chart illustrating the architecture and functionality of the computer system depicted in FIG. 1 while the computer system is executing a function of a computer program.

The preferred use and operation of the computer system 20 and associated methodology are described hereafter with particular reference to FIG. 3.

Assume that the compiler 26, in compiling the source program 22 into executable program 24, allocates various blocks of contiguous memory locations within memory 21 to a particular function 76 of the executable program 24 in block 82 of FIG. 3. The compiler 26 preferably defines range data that identifies the blocks of contiguous memory locations. For example, the range data may include sets of data, in which each set corresponds to one of the blocks of contiguous memory 21. Each set may include two memory addresses, the memory address of the first memory location in the corresponding block of contiguous memory and the memory address of the last memory location in the corresponding block of contiguous memory 21. Thus, each set of range data identifies one of the blocks of contiguous memory 21 allocated to the function 76.

To illustrate the foregoing, assume that the memory addresses of memory 21 are expressed in binary form and that two blocks of contiguous memory 21 are allocated to the function 76 in block 82. Further assume that one block of contiguous memory 21 includes memory locations having memory addresses from 00000000 through 00001000, and assume that the other block of contiguous memory 21 includes memory locations having memory addresses 10000000 through 10001000. In this example, the memory addresses 00000000 and 00001000 may define a first set of range data, and the memory addresses 10000000 and 10001000 may define another set of range data.

The compiler 26 preferably includes instructions in the executable program 24 to cause the range data to be loaded into one or more of the registers 72 of the processing circuitry 35 in response to invocation of the function 76, as shown by blocks 85 and 87 of FIG. 3. Before each instruction of the function 76 is executed, the processing circuitry 35 checks to determine whether or not execution of the instruction will cause a memory location outside of the function's allocated memory 21 to be accessed, as shown by block 89. In the preferred embodiment, the control circuitry 68 in block 89, compares the memory address of each memory location that is to be accessed via execution of an instruction to the range data stored in the registers 72 at block 87.

If each memory address to be accessed via execution of the foregoing instruction is within the range defined by the range data (e.g, if each such memory address is between the memory addresses of any of the sets of range data), then execution of the instruction will not cause a memory location outside of the memory 21 allocated to the function 76 to be accessed. Therefore, the instruction may be executed in block 92.

However, if any memory address to be accessed via execution of the foregoing instruction is outside of the range defined by the range data (e.g., if any such memory address is not between the memory addresses of any of the sets of range data), then execution of the instruction will cause a memory location outside of the memory 21 allocated to the function 76 to be accessed. As a result, an error message is generated in block 93, and execution of the instruction is prevented by the control circuitry 68.

In a first example, assume that the instruction being analyzed in block 89, if executed, accesses the memory location identified by memory address 00000001. This memory address is between the addresses defining one of the sets of range data. In particular, the memory address is between memory addresses 00000000 and 00001000. Therefore, the memory address is within the range defined by the range data, and the instruction may be executed in block 92. Thus, the instruction should be executed in block 92, unless there is some reason independent of the range data that should prevent execution of the instruction.

In a second example, assume that the instruction being analyzed in block 89, if executed, accesses the memory location identified by memory address 00001001. This memory address is outside of the range defined by the range data. In particular, this memory address is not between addresses 00000000 and 00001000 and is not between addresses 10000000 and 10001000. Therefore, execution of the instruction may cause an error, and an error message is generated in block 93. Furthermore, to prevent a potential data error from occurring, the processing circuitry 35 refrains from executing the instruction.

During execution of the function 76 and, in particular, after the registers 72 have been loaded with the range data of the function 76, additional memory 21 may be allocated to the function 76 in block 95. There are a variety of ways that this may occur. For example, additional memory 21 may be allocated to the function 76 in response to execution of an instruction of the function 76, or the operating system 28 may allocate the additional memory 21 to the function 76. There may be various other methodologies that may be employed to allocate additional memory 21 to the function 76 in block 95.

If additional memory 21 is allocated to the function 76 in block 95, then the range data of the function 76 is updated in block 97 such that the range data identifies the additional memory 21 newly allocated to the function 76 in addition to the memory 21 previously allocated to the function 76. For example, assume that a block of contiguous memory locations having memory addresses 10001001 through 10001100 are allocated to the function 76 in block 95. The range data could be updated to include an additional set of range data that is defined by addresses 10001001 and 10001100. Alternatively, the set of range data defined by addresses 10000000 and 10001000 could be modified such that the set of range data is defined by addresses 10000000 and 10001100 instead. In any event, the range data is updated such that the range data indicates that memory locations having addresses 00000000 through 00001000 and addresses 10000000 through 10001100 are within the memory 21 allocated to the function 76.

After performing block 95 and, if necessary, block 97, the aforementioned process is repeated, as shown by block 99, unless the instruction just executed in block 92 is the last instruction of the function 76 that is to be executed. Thus, the aforementioned process is performed for each instruction in the function 76 processed by the processing circuitry 35, unless one of the instructions attempts to access a memory location outside of the memory 21 allocated to the function 76. Once the last instruction of the function 76 is processed or once one of the function's instructions attempts to access a memory location outside of the memory 21 allocated to function 76, the function 76 is terminated (i.e., the processing circuitry 35 stops executing instructions from the function 76 and the operating system 28 stops transmitting instructions from the function 76 to the processing circuitry 35). At a later time, the function 76 may again be invoked, and the process described above may be repeated.

It should be noted that it is not necessary for block 82 to be performed by compiler 26. There are a variety of methodologies that may be employed to allocate memory to a function 76 before the function 76 is invoked. Further, it is possible for block 82 to be performed after block 85. For example, an instruction in executable program 24, when executed, may cause memory 21 to be allocated to the function 76. This instruction may be executed before or after the function 76 is invoked. Furthermore, the operating system 28 may allocate memory 21 to the function 76 at any time, including after the function 28 is invoked.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer system, comprising:

memory having a plurality of memory locations;

a memory device for storing data, said data indicative of which of said memory locations are allocated to a computer program function; and circuitry coupled to said memory device and to a processor pipeline, said circuitry configured to analyze an instruction during execution of said instruction by said pipeline, said circuitry further configured to detect, based on said data, whether a memory location to be accessed via execution of said instruction of said function is one of said memory locations allocated to said function.

2. The computer system of claim 1, wherein said memory device is a register.

3. The computer system of claim 1, wherein said circuitry stores said data, in response to invocation of said function, in said memory device.

4. The computer system of claim 1, wherein said circuitry is further configured to prevent execution of said instruction in response to a detection by said circuitry that said memory location to be accessed via execution of said instruction is not one of said memory locations allocated to said function.

5. The computer system of claim 1, wherein said circuitry is further configured to selectively prevent execution of said instruction based on a run time input and in response to a detection by said circuitry that said memory location to be accessed via execution of said instruction is not one of said memory locations allocated to said function.

6. The computer system of claim 1, wherein said control circuitry is further configured to disable said pipeline from executing said instruction, when said pipeline is processing said instruction, in response to a detection by said circuitry that said memory location to be accessed via execution of said instruction is not one of said memory locations allocated to said function.

7. The computer system of claim 1, wherein said circuitry is further configured to transmit an error signal in response to a detection by said circuitry that said memory location to be accessed via execution of said instruction is not one of said memory locations allocated to said function.

8. The computer system of claim 7, further comprising an operating system configured to cause an error message to be displayed to a user of said computer system in response to said error signal.

9. The computer system of claim 1, further comprising an operating system configured to allocate additional memory locations to said function, said operating system configured to update said data such that said data indicates that said additional memory locations have been allocated to said function.

10. The computer system of claim 1, wherein said data indicates that at least one block of contiguous memory is allocated to said function, said data including a first memory address of a boundary location within said block of contiguous memory and a second memory address of another boundary location within said block of contiguous memory.

11. A computer system, comprising:
memory having a plurality of memory locations;
a memory device for storing data, said data indicative of which of said memory locations are allocated to a computer program function; and
circuitry coupled to said memory device and to a pipeline, said pipeline configured to process and execute instructions of computer programs, said circuitry configured to analyze an instruction to determine if a memory address is accessed via execution of said instruction, said circuitry further configured to compare said data to said memory address included in said instruction and to detect, based on said data, whether said memory location identified by said memory address of said instruction is one of said memory locations allocated to said function.

12. The system of claim 11, wherein said memory device is a register.

13. The system of claim 11, wherein said circuitry is responsive to invocation of said function for storing said data in said memory device.

14. The system of claim 11, wherein said control circuitry is further configured to disable said pipeline from executing said instruction, when said pipeline is processing said instruction, in response to a detection by said circuitry that said memory location identified by said memory address of said instruction is not one of said locations allocated to said function.

15. The system of claim 11, wherein said circuitry is configured to prevent execution of said instruction in response to a detection by said circuitry that said memory location identified by said memory address of said instruction is not one of said locations allocated to said function.

16. The system of claim 11, wherein said circuitry is further configured to selectively prevent execution of said instruction based on a run time input and in response to a detection by said circuitry that said memory location identified by said memory address of said instruction is not one of said locations allocated to said function.

17. The system of claim 11, wherein said circuitry is configured to transmit an error signal in response to a detection by said circuitry that said memory location identified by said memory address of said instruction is not one of said locations allocated to said function.

18. The system of claim 11, further comprising an operating system configured to allocate additional memory locations to said function, said operating system configured to update said data such that said data indicates that said additional memory locations have been allocated to said function.

19. The system of claim 11, wherein said data indicates that at least one block of contiguous memory is allocated to said function, said data including a first memory address of a boundary location within said block of contiguous memory and a second memory address of another boundary location within said block of contiguous memory, said circuitry further configured to detect that said memory location identified by said memory address of said instruction is one of said locations allocated to said function when said memory address of said instruction is between said first memory address and said second memory address.

20. A computer system, comprising:
memory;
means for storing data, said data indicative of which locations of said memory are allocated to a function;
means for processing and executing instructions of said computer program-via a pipeline;
means for analyzing said instructions executed by said pipeline; and
means for detecting, based on said data, whether a memory location to be accessed via execution by said pipeline of an instruction of said function is one of said memory locations allocated to said function.

21. A method, comprising the steps of:
providing memory;
allocating memory locations of said memory to a computer program function;
invoking said function;
storing, in response to said invoking step, data indicative of which memory locations of said memory are allocated to said function;
detecting, based on said data, whether an instruction of said function, if executed by a pipeline, accesses one of said memory locations allocated to said function; and
preventing execution of said instruction in response to a detection in said detecting step that said instruction, if executed, accesses a memory location that has not been allocated to said function.

22. The method of claim 21, wherein said preventing step includes the step of:

disabling, in response to said detection, a processor pipeline processing said instruction.

23. The method of claim 21, further comprising the steps of:

receiving a run time input; and selectively performing said preventing step based on said run time input.

24. The method of claim 21, further comprising the steps of:

transmitting an error signal in response to said detection; and producing an error message in response to said error signal.

25. The method of claim 21, further comprising the steps of:

dynamically allocating additional memory locations to said function; and updating said data in response to said dynamically updating step.

26. The method of claim 21, wherein said data indicates that at least one block of contiguous memory is allocated to said function, said data including a first memory address of a boundary location within said block of contiguous memory and a second memory address of another boundary location within said block of contiguous memory, said detecting step further comprising the steps of:

comparing a memory address included in said instruction to said first and second memory addresses; and detecting said detection in response to a determination that said memory address included in said instruction is not between said first and second memory addresses.

27. A method, comprising the steps of:

providing memory and a processor pipeline;

allocating memory locations of said memory to a computer program function;

storing data indicative of which memory locations of said memory are allocated to said function;

detecting, based on said data, whether an instruction of said function, when executed by said pipeline, accesses one of said memory locations allocated to said function; and disabling said pipeline from executing said instruction while said pipeline is processing said instruction and in response to a detection in said detecting step that said instruction, if executed, accesses a memory location that has not been allocated to said function.

28. The method of claim 27, further comprising the steps of:

transmitting an error signal in response to said detection; and producing an error message in response to said error signal.

29. The method of claim 27, further comprising the steps of:

dynamically allocating additional memory locations to said function; and updating said data in response to said dynamically allocating step.

30. The method of claim 27, wherein said data indicates that at least one block of contiguous memory is allocated to said function, said data including a first memory address of a boundary location within said block of contiguous memory and a second memory address of another boundary location within said block of contiguous memory, said detecting step further comprising the steps of:

comparing a memory address included in said instruction to said first and second memory addresses; and detecting said detection in response to a determination that said memory address included in said instruction is not between said first and second memory addresses.

31. The method of claim 27, further comprising the steps of:

receiving a run time input; and selectively performing said disabling step based on said run time input.

32. A computer system, comprising:

a processor;

a pipeline, integral with said processor, configured to execute instructions of a function of a computer program;

a register integral with said processor for storing range data upon invocation of the function, said range data defining a memory range for said function defined at compile time of the computer program;

circuitry configured to detect a request for access to memory during execution by said pipeline, said circuitry further configured to ensure that said request for access of memory corresponds to said range data.

33. The system of claim 32, wherein the circuitry is integral with said processor.

34. A method, comprising the steps of:

storing range data in a register resident on a processor, said range data corresponding to a range of memory locations available for use by a function of a computer program;

executing instructions via a pipeline resident on the processor, said instructions corresponding to the function;

detecting one of said instructions that is attempting to access a detected memory location; and comparing the detected memory location with said range data to determine if said detected memory location correspond to said range of memory locations.

35. The method of claim 34, further comprising the step of prohibiting access to the detected memory location is the detected memory location does not correspond to the range data as determined in said comparing step.

* * * * *

UNITED STATES PATENT AND TRADEMARK OFFICE
CERTIFICATE OF CORRECTION

PATENT NO. : 6,697,971 B1 Page 1 of 1
DATED : February 24, 2004
INVENTOR(S) : Lawrence D.K.B. Dwyer It is certified that error appears in the above-identified patent and that said Letters Patent is hereby corrected as shown below:

<u>Column 14,</u>
Line 51, delete "correspond" and insert therefor -- corresponds --

Signed and Sealed this

Twenty-fifth Day of January, 2005

JON W. DUDAS
*Director of the United States Patent and Trademark Office*